(12) United States Patent
Chou et al.

(10) Patent No.: US 11,046,128 B2
(45) Date of Patent: Jun. 29, 2021

(54) ANTI-SPRAY STRUCTURE FOR CONENTION OF AIR NOZZLE OF TIRE OF VEHICLE AND CONENCTION HOSE OF AIR COMPRESSOR

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

( * ) Notice: Subject to any disclaimer, the term of this patent is extended or adjusted under 35 U.S.C. 154(b) by 0 days.

(21) Appl. No.: 17/010,585

(22) Filed: Sep. 2, 2020

(65) Prior Publication Data
US 2021/0078372 A1    Mar. 18, 2021

(51) Int. Cl.
    *B60C 29/06*    (2006.01)
    *B29C 73/16*    (2006.01)
    *B60S 5/04*    (2006.01)
    *B29L 30/00*    (2006.01)

(52) U.S. Cl.
    CPC .......... *B60C 29/064* (2013.01); *B29C 73/166* (2013.01); *B60C 29/062* (2013.01); *B60S 5/04* (2013.01); *B29L 2030/00* (2013.01)

(58) Field of Classification Search
    CPC ... B60C 29/064; B60C 29/062; B29C 73/166; B60S 5/04; B29L 2030/00
    USPC .......................................................... 141/38
    See application file for complete search history.

(56) References Cited

U.S. PATENT DOCUMENTS

| | | | |
|---|---|---|---|
| 6,786,247 B1 * | 9/2004 | Kemppainen | F04B 33/005 137/223 |
| 8,627,857 B2 * | 1/2014 | Chou | B60S 5/046 141/38 |
| 10,029,429 B2 * | 7/2018 | Eckhardt | B60C 29/064 |
| 2008/0190489 A1 * | 8/2008 | Wrubel | F16L 37/1215 137/231 |
| 2011/0011217 A1 * | 1/2011 | Kojima | B29C 73/166 81/15.2 |
| 2013/0105055 A1 * | 5/2013 | Chou | B60S 5/043 152/416 |
| 2013/0284312 A1 * | 10/2013 | Chou | F16K 15/20 141/38 |
| 2015/0151594 A1 * | 6/2015 | Hong | B29C 73/166 141/38 |
| 2016/0136906 A1 * | 5/2016 | Chou | B29C 73/166 141/38 |
| 2019/0100062 A1 * | 4/2019 | Kuo | F16K 15/207 |
| 2019/0193349 A1 * | 6/2019 | Chou | B29C 73/166 |
| 2020/0376908 A1 * | 12/2020 | Chou | F16L 35/00 |

* cited by examiner

*Primary Examiner* — Timothy P. Kelly

(57) ABSTRACT

An anti-spray structure for a connection of an air nozzle of a tire of a vehicle and a connection hose of an air compressor, and the air compressor contains: a box, a sealant supply can, and a connection hose. The box accommodates the air compressor. The sealant supply can includes an open segment and a supply tube. The connection hose includes a first segment and a second segment. The second segment has an anti-spray connector including a fitting sleeve. The fitting sleeve has a threaded orifice, a through orifice, and a projected shoulder. A cylindrical base includes a cylindrical room, a stepped coupling segment, a conduit, and a first stepped portion. A first spring is received into the cylindrical room. A valve bolt includes a post, a connecting disc, spaced slots, and a first seal ring. A lock element includes a hollow cavity, a hexagonal tab, and a tilted extension.

7 Claims, 10 Drawing Sheets

ANTI-SPRAY STRUCTURE FOR CONENTION OF AIR NOZZLE OF TIRE OF VEHICLE AND CONENCTION HOSE OF AIR COMPRESSOR

FIELD OF THE INVENTION

The present invention relates to an anti-spray structure for a connection of an air nozzle of a tire of a vehicle and a connection hose of an air compressor is capable of avoiding an eruption of the chemical sealant in an incorrect operation.

BACKGROUND OF THE INVENTION

A conventional air nozzle of a tire of a vehicle is applied to inflate or discharge airs into or from the tire. Furthermore, a conventional tire repair device is employed to feed chemical sealant and to inflate airs into the tire which is broken. The tire repair device is connected with an air compressor, and a sealant supply can is connected with an outlet valve of the air compressor, wherein compressed airs are controlled by a control valve to output the chemical sealant out of a connector on a distal end of a connection hose with the compressed airs. However, when a connection structure of the connector of the connection hose and the air core of the tire is not operated properly, the chemical sealant erupts out of the connector of the connection hose easily.

The present invention has arisen to mitigate and/or obviate the afore-described disadvantages.

SUMMARY OF THE INVENTION

The primary aspect of the present invention is to provide an anti-spray structure for a connection of an air nozzle of a tire of a vehicle and a connection hose of an air compressor is capable of avoiding an eruption of the chemical sealant in an incorrect operation.

DETAILED DESCRIPTION OF THE PREFERRED EMBODIMENTS

Figure 1:
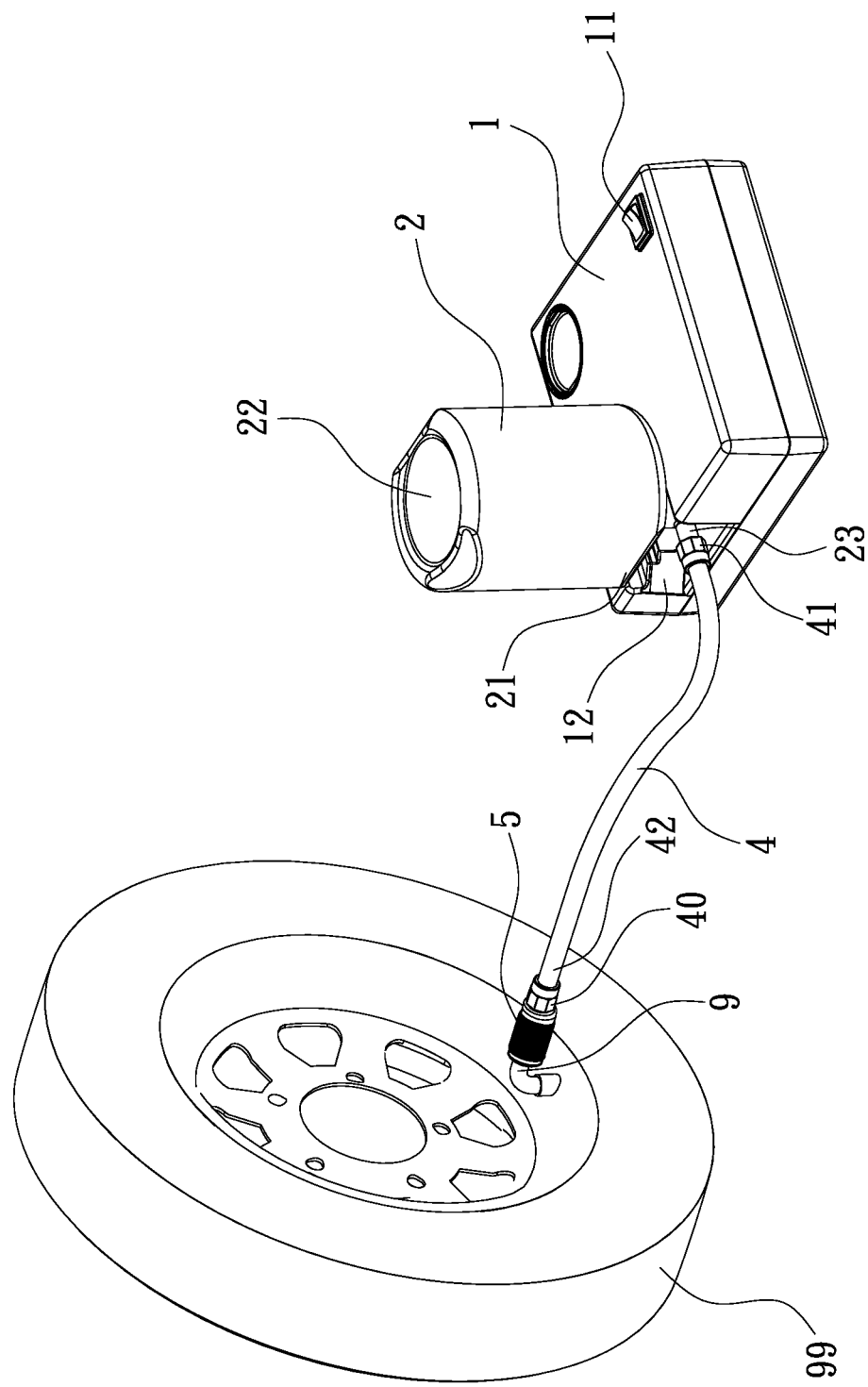
FIG. 1 is a perspective view showing the application of an anti-spray structure for a connection of an air nozzle of a tire of a vehicle and a connection hose of an air compressor according to a preferred embodiment of the present invention.
Figure 2:
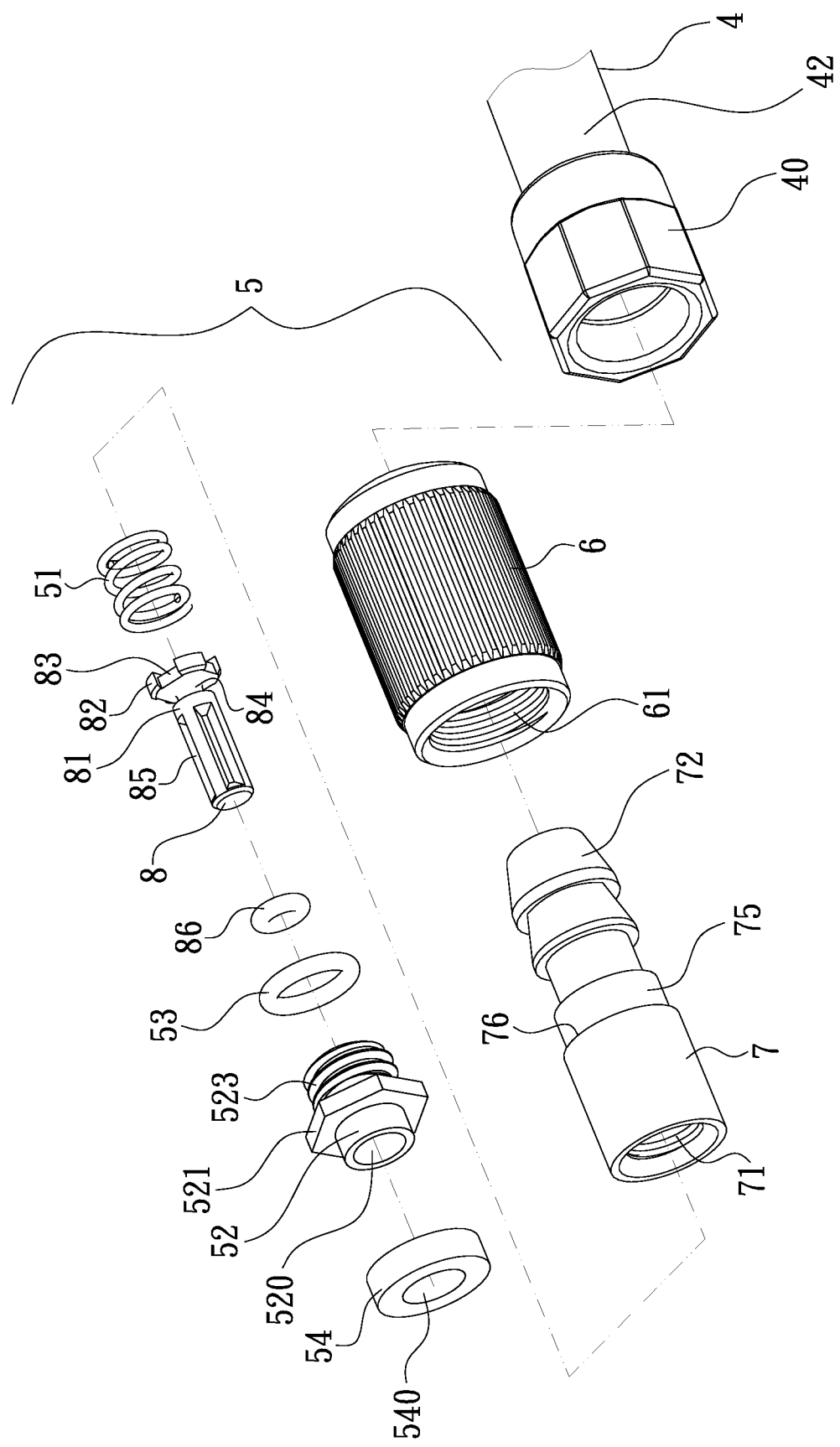
FIG. 2 is a perspective view showing the exploded components of the anti-spray structure according to the preferred embodiment of the present invention.
Figure 3:
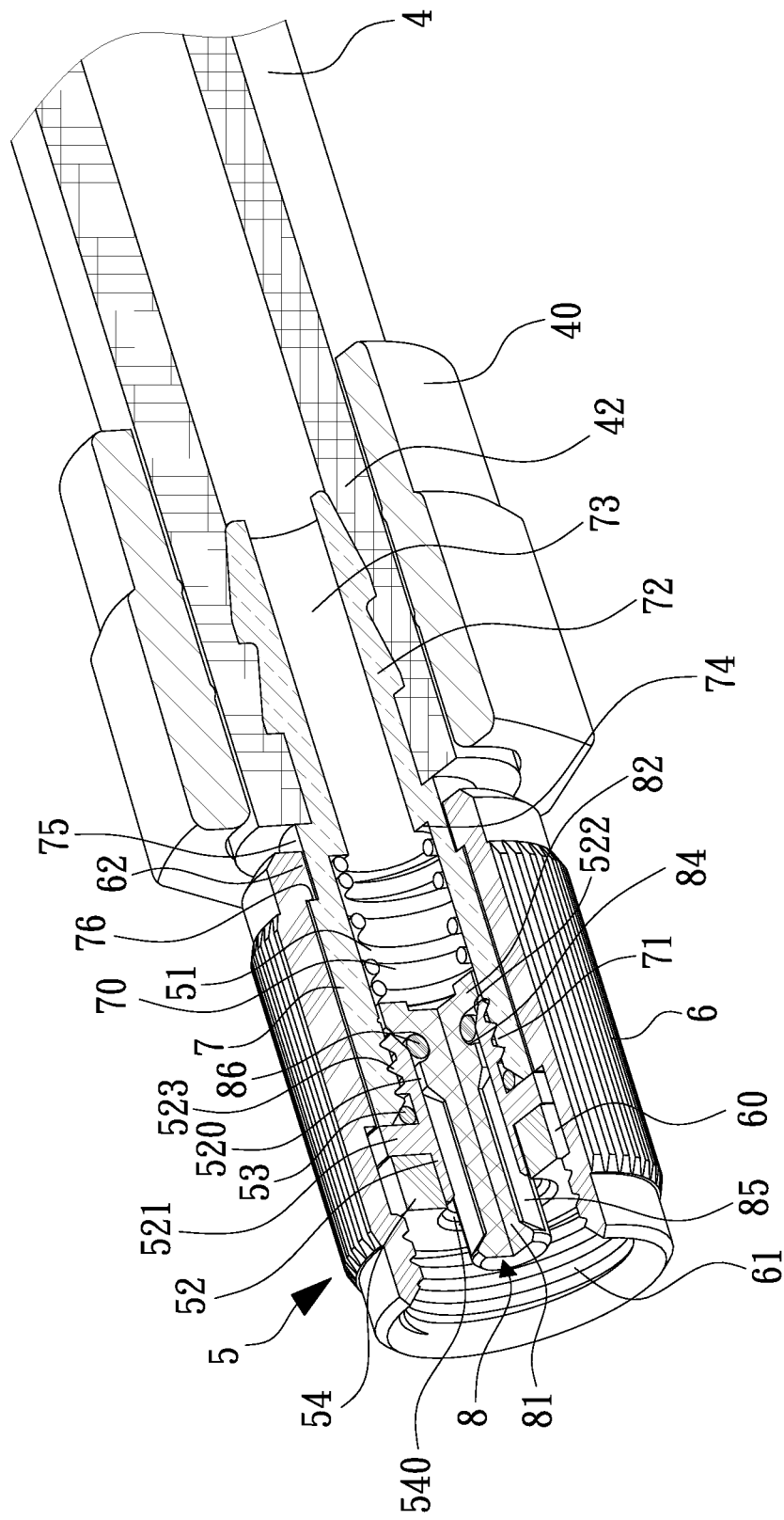
FIG. 3 is a cross-sectional perspective view showing the assembly of the anti-spray structure according to the preferred embodiment of the present invention.

With reference to FIGS. 1-3, an air compressor according to a preferred embodiment of the present invention comprises: a box 1, a sealant supply can 2, and a connection hose 4.

The box 1 includes a button 11 fixed on a top thereof, a coupling orifice 12 defined on a peripheral side thereof, and a body of the air compressor (not shown) accommodated in the box 1. The connection hose 4 includes a first segment 41 formed on a first end thereof, and the connection hose 4 includes a second segment 42 formed on a second end thereof and having an anti-spray connector 5 connected on the second segment 42. The sealant supply can 2 is connected on the coupling orifice 12, and the tire sealant supply can 2 includes an open segment 21 extending downward, a bottom fringe 22 extending upward, and a supply tube 23 configured to engage with the first segment 41 of the connection hose 4. The anti-spray connector 5 of the second segment 42 of the connection hose 4 is screwed with an air nozzle 9 of a tire 99, when feeding chemical sealant and inflating compressed airs to the tire 99 which is broken. After the box 1 is started by a vehicle power supply or other DC power supplies, the compressed airs of the air compressor force the chemical sealant of the sealant supply can 2 to flow into the tire 99 via the connection hose 4, thus repairing and inflating the tire 99.

Figure 4:
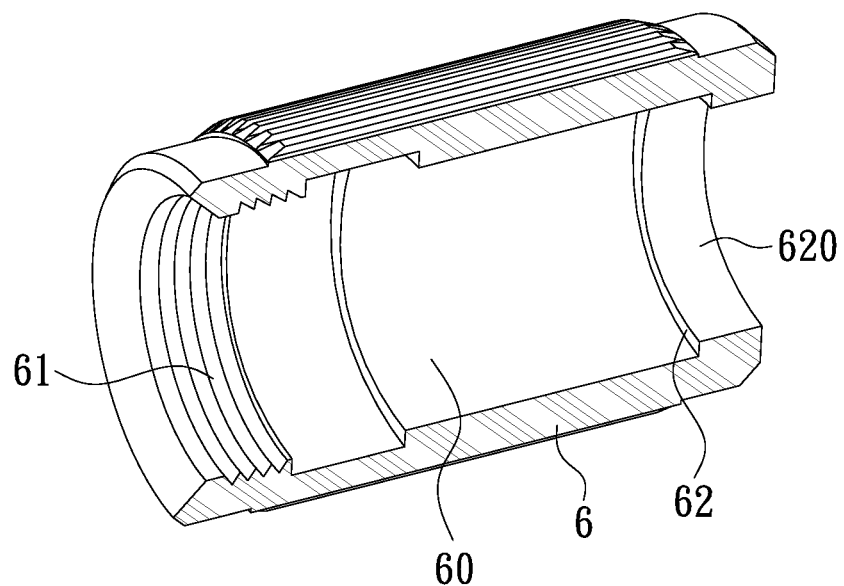
FIG. 4 is a cross-sectional perspective view showing the assembly of a fitting sleeve of the anti-spray structure according to the preferred embodiment of the present invention.
Figure 5:
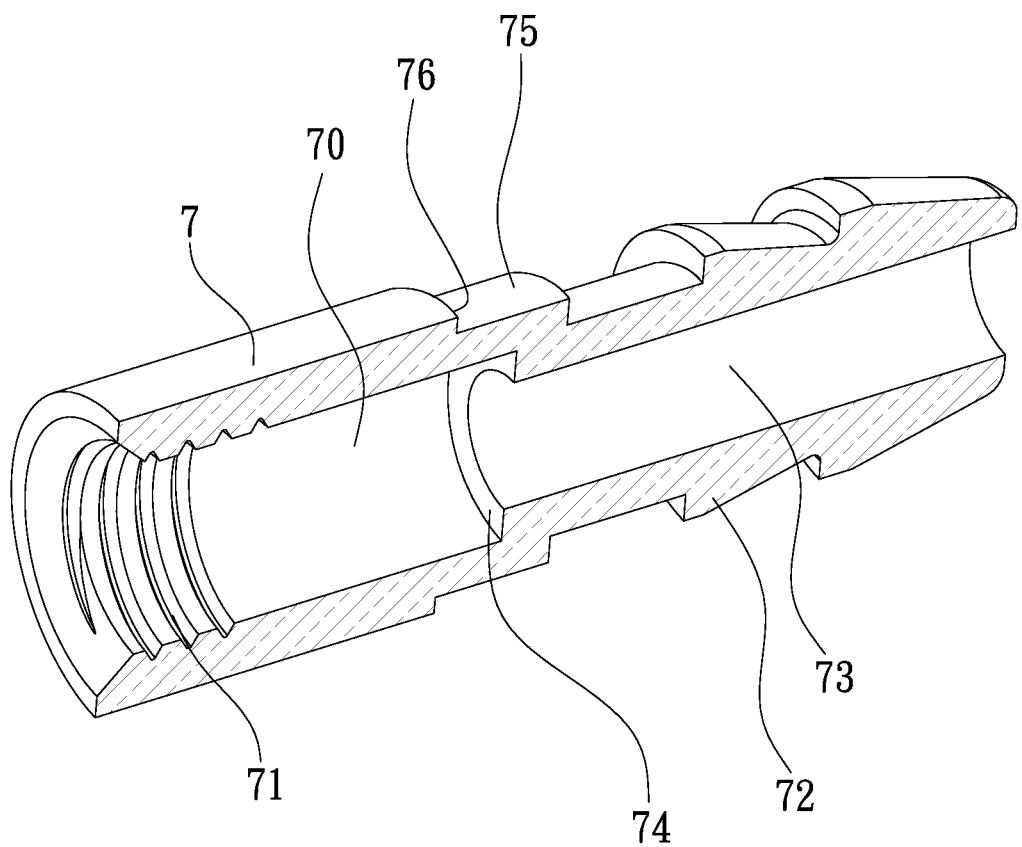
FIG. 5 is a cross-sectional perspective view showing the assembly of a cylindrical base of the anti-spray structure according to the preferred embodiment of the present invention.

Referring to FIGS. 2-8, an anti-spray structure for a connection of the air nozzle of the tire of a vehicle and the air compressor is applied to avoid eruption of the chemical sealant, and the anti-spray structure comprises the anti-spray connector 5 connected on the second segment 42 of the connector hose 4, the anti-spray connector 5 includes a fitting sleeve 6 (as shown in FIG. 4) formed in a cylinder shape, and the fitting sleeve 6 has a chamber 60 defined therein, a threaded orifice 61 formed in a first end of the threaded orifice 6 and having female threads, a through orifice 620 defined on a second end of the fitting sleeve 6, a projected shoulder 62 formed on an inner wall of the through orifice 620, and a diameter of the projected shoulder 62 is more than a diameter of the through orifice 620, wherein the threaded orifice 61, the chamber 60, and the through orifice 620 are communicated with one another. A cylindrical base 7 (as shown in FIG. 5) includes a cylindrical room 70, female threads 71 formed adjacent to a first end of the cylindrical base 7, a stepped coupling segment 72 extending on a second end of the cylindrical base 7, and a conduit 73 defined in the coupling segment 72 and communicating with the cylindrical room 70, wherein a diameter of the cylindrical room 70 is more than a diameter of the conduit 73, and the cylindrical base 7 further includes a first stepped portion 74 formed between the cylindrical room 70 and the conduit 73, a recessed section 75 formed on an outer wall of the cylindrical base 7 proximate to the coupling segment 72, wherein a diameter of the cylindrical base 7 is more than a diameter of the recessed section 75, and a second stepped portion 76 is defined between the cylindrical base 7 and the recessed section 75.

The coupling segment 72 of the cylindrical base 7 is put into the chamber 60 from the threaded orifice 61 of the fitting sleeve 6 via the through orifice 620, such that the projected shoulder 62 contacts with the second stepped portion 76 of the cylindrical base 7, the coupling segment 72 of the cylindrical base 7 extends out of the fitting sleeve 6 to connect with the second segment 42 of the connection hose 4, and a fixing bushing 40 is configured to connect the connection hose 4 and the anti-spray connector 5, as illustrated in FIG. 3.

Figure 6:
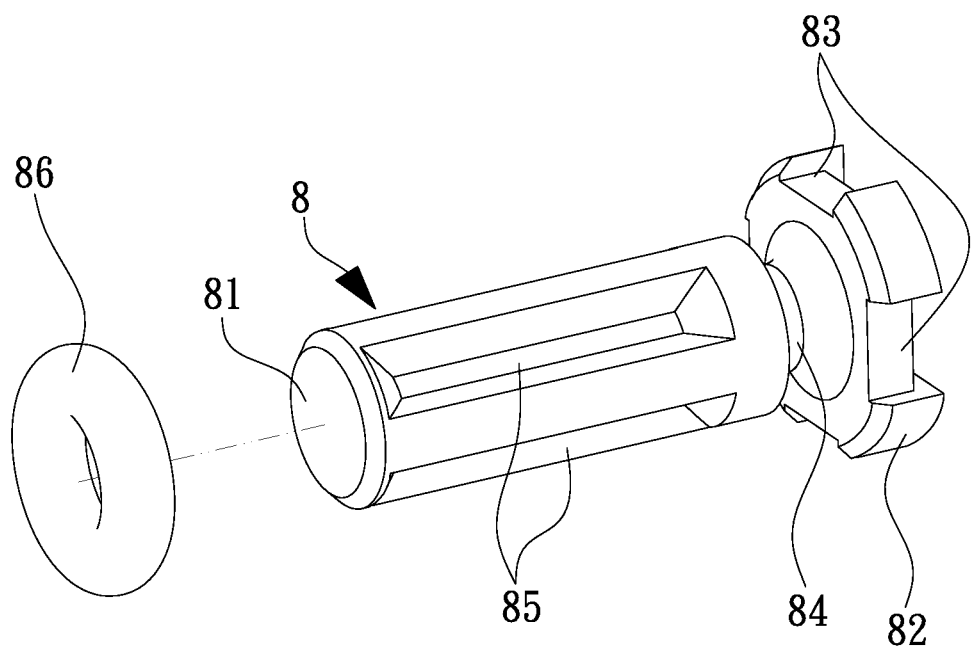
FIG. 6 is a perspective view showing the assembly of a valve bolt of the anti-spray structure according to the preferred embodiment of the present invention.
Figure 7:
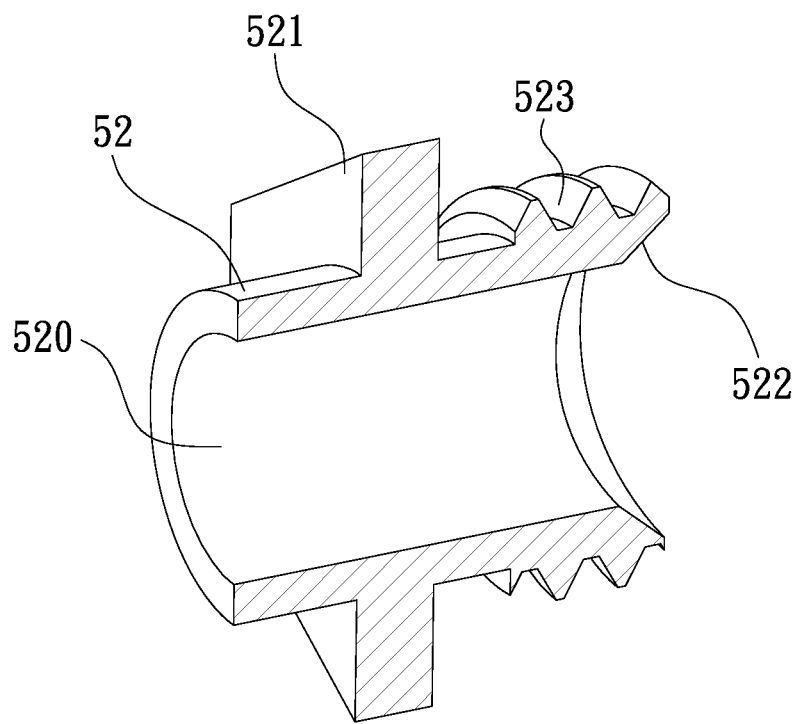
FIG. 7 is a cross-sectional perspective view showing the assembly of a lock element of the anti-spray structure according to the preferred embodiment of the present invention.

A first spring 51 is received into the cylindrical room 70 of the cylindrical base 7 so that a first end of the first spring 51 abuts against the first stepped portion 74; a valve bolt 8 (as shown in FIG. 6) includes a post 81 extending on a first end thereof, a connecting disc 82 extending from a second end of the valve bolt 8, multiple recesses 83 formed around an outer wall of the connecting disc 82, a neck 84 formed between the post 81 and the connecting disc 82, multiple spaced slots 85 defined around the post 81, and a first seal ring 86 fitted on the neck 84 of the valve bolt 8, such that the second end of the valve bolt 8 is put into the cylindrical room 70 of the cylindrical base 7 to contact with a second end of the first spring 51, as illustrated in FIG. 3. A lock element 52 (as shown in FIG. 7) includes a hollow cavity 520 defined therein, a hexagonal tab 521 extending around a first end of the lock element 52, a tilted extension 522 extending on a second end of the lock element 52, male threads 523 formed around the tilted extension 522 of the lock element 52; and a second seal ring 53 is fitted from the male threads of the tilted extension 522 of the lock element 52 to contact with the hexagonal tab 521, such that when the lock element 52 is fixed with the valve bolt 8 and the cylindrical base 7, the male threads 523 of the lock element 52 are screwed with the female threads 71 of the cylindrical base 7, the first spring 51 pushes the valve bolt 8 to contact with the lock element 52, and the first seal ring 86 of the valve bolt 8 abuts against the tilted extension 522 of the lock element 52; an abutting loop 54 has a passing orifice 540 (as illustrated in FIG. 2) and is put into the threaded orifice 61 of the fitting sleeve 6 to fit on the lock element 52 and to abut against the hexagonal tab 521, as shown in FIG. 3. The multiple spaced slots 85 of the valve bolt 8 pass through the hollow cavity 520 of the lock element 52 and the passing orifice 540 of the abutting loop 54 to locate in the threaded orifice 61, hence the first spring 51 forces the first seal ring 86 of the valve bolt 8 to contact with the tilted extension 522 of the lock element 52 matingly.

Figure 8:
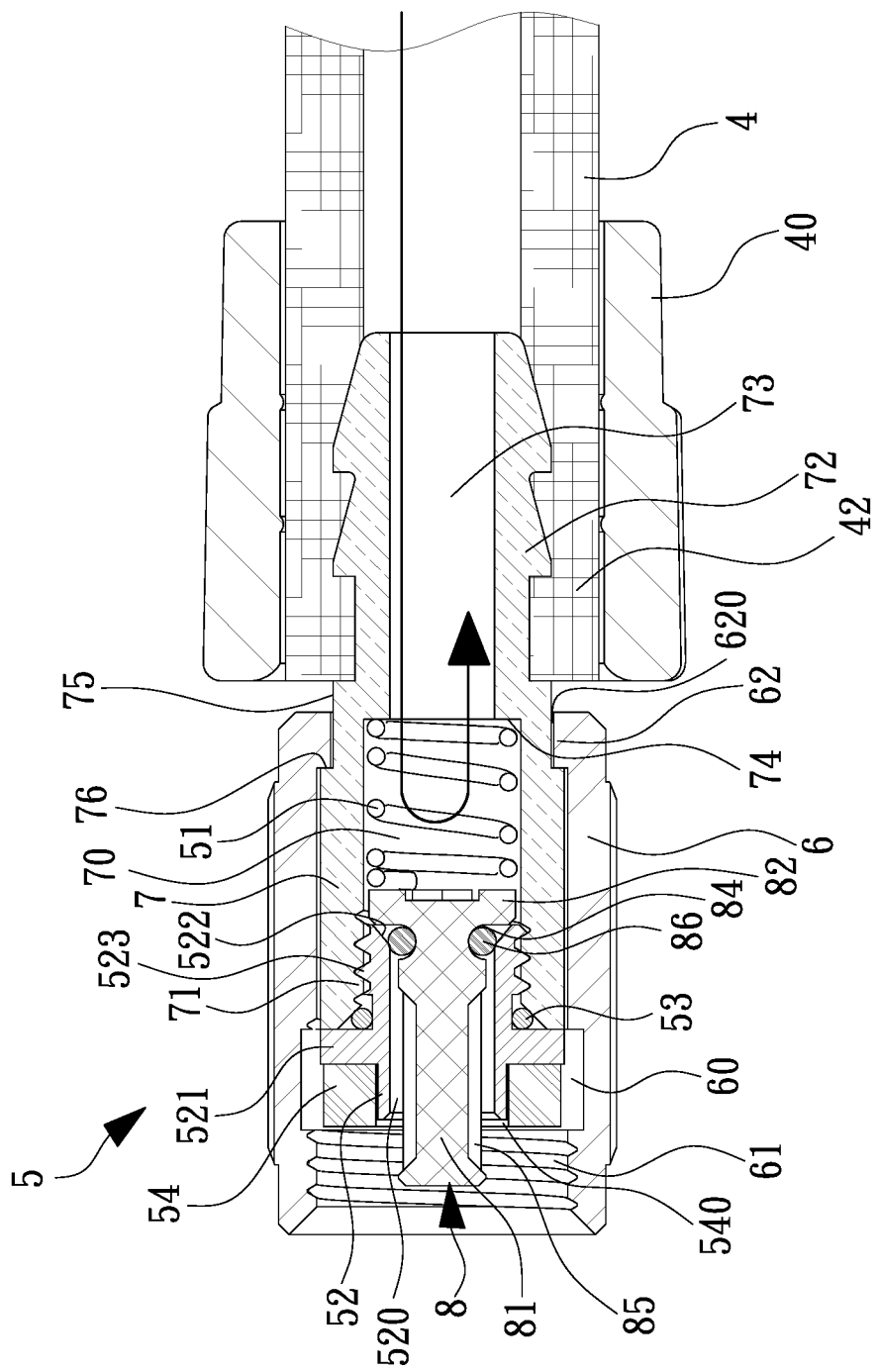
FIG. 8 is a cross-sectional view showing the connection of the anti-spray structure and the connection hose according to the preferred embodiment of the present invention.

Referring to FIG. 8, after the button 11 of the box 1 is turned on (as shown in FIG. 1), a pressure of the compressed airs of the air compressor forces the chemical sealant to flow, but the chemical sealant does not flow through the hollow cavity 520 of the lock element 52 because the first seal ring 86 of the valve bolt 8 contacts with the tilted extension 522 of the lock element 52 tightly, thus avoiding the eruption of the chemical sealant.

Figure 9:
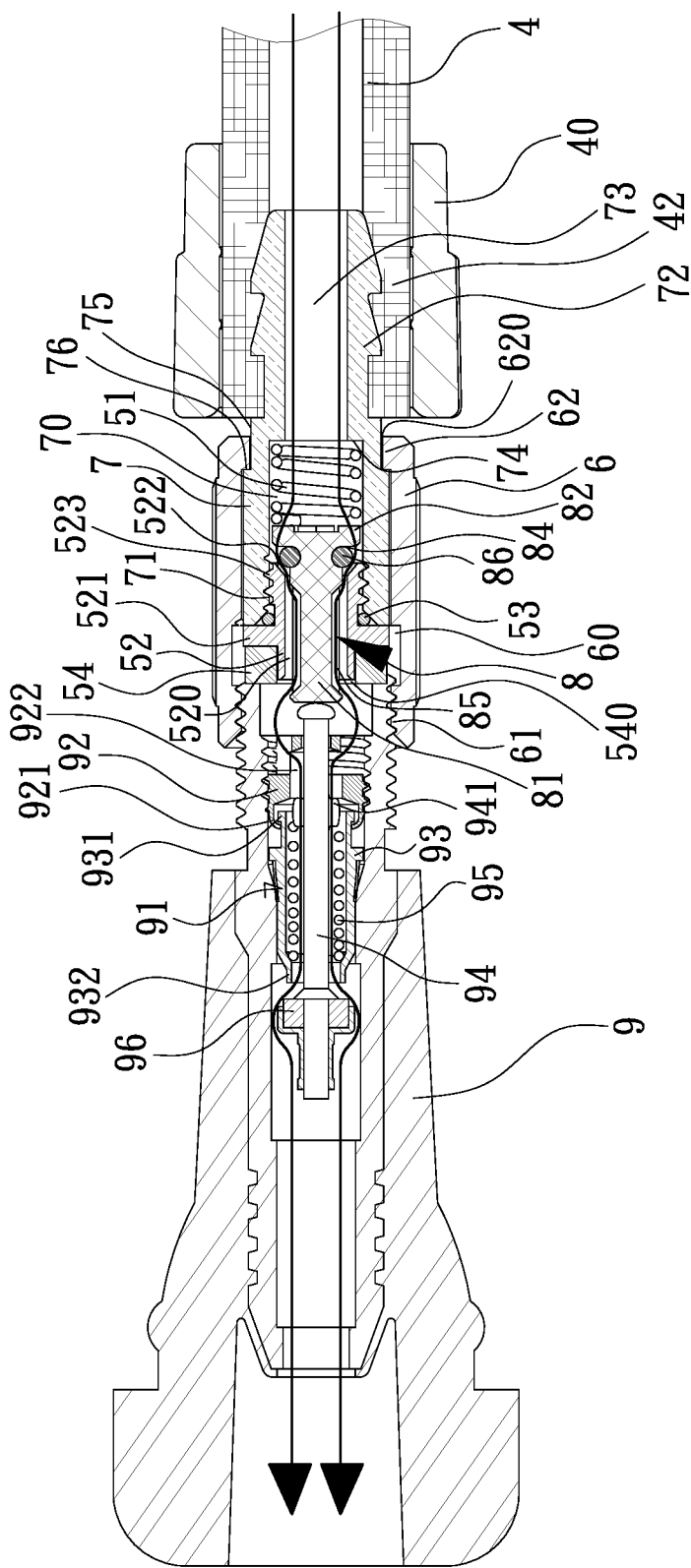
FIG. 9 is a cross-sectional view showing the operation of the anti-spray structure according to the preferred embodiment of the present invention.
Figure 10:
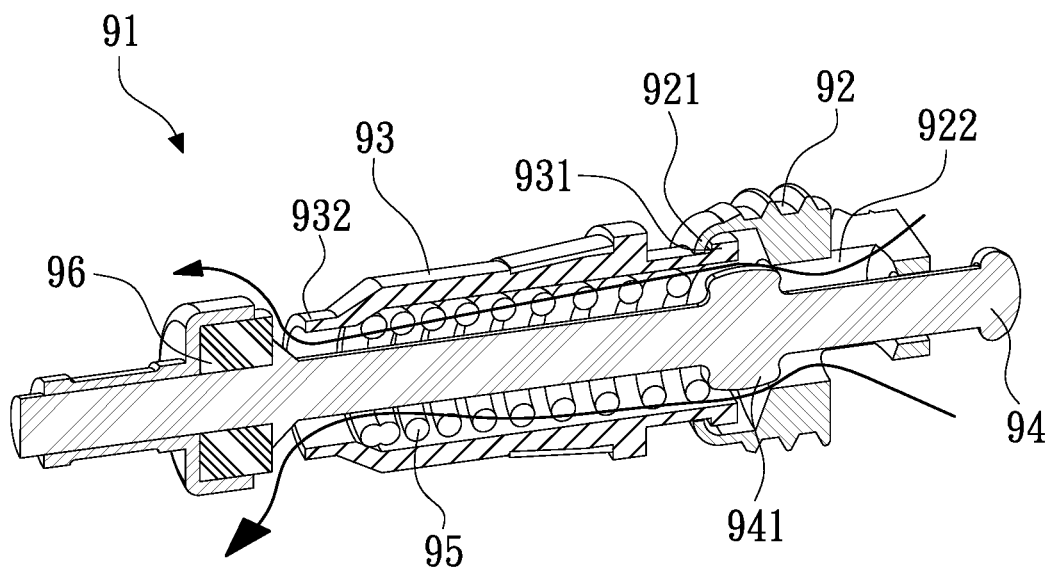
FIG. 10 is a cross-sectional perspective view showing the assembly of a valve core assembly of the air nozzle of the tire according to the preferred embodiment of the present invention.

As shown in FIGS. 9 and 10, a valve core assembly 91 is accommodated in the air nozzle 9 of the tire 99, and the valve core assembly 91 includes a mounting 92, an arcuate stop shoulder 921 surrounding around a mouth of the mounting 92 and extending inward from an end of the mounting 92, and an aperture 922 defined in the mounting 92; a hollow receiving sleeve 93 having a retaining shoulder 931 formed on a first end of the hollow receiving sleeve 93, and a holder 932 formed on a second end of the hollow receiving sleeve 93; a central needle 94 formed in a column shape and having multiple spaced ribs 941 formed on the central needle 94; a second spring 95 fitted with the central needle 94 and a first end of the second spring 95 abutting against the multiple spaced ribs 941 of the central needle 94; the central needle 94 being received in the hollow receiving sleeve 93 from the first end of the hollow receiving sleeve 93 so that a second end of the second spring 95 contacts with the holder 932, and the second spring 95 is surrounded by the receiving hollow sleeve 93; a contacting loop 96 fitted on a first end of the central needle 94; such that after the hollow receiving sleeve 93 is connected with the mounting 92, the arcuate stop shoulder 921 of the mounting 92 engages with the retaining shoulder 931 of the hollow receiving sleeve 93, a second end of the central needle 94 extends out of the aperture 922 of the mounting 92, and the second spring 95 pushes the contacting loop 96 of the central needle 94 to close the holder 932 of the hollow receiving sleeve 93.

As illustrated in FIGS. 1 and 9, when the threaded orifice 61 of the anti-spray connector 5 is screwed with the air nozzle 9 of the tire 99, the valve bolt 8 of the anti-spray connector 5 contacts with and urges the central needle 94 of the air nozzle 9 of the tire 99 to move so that the contacting loop 96 of the central needle 94 removes from the holder 932 of the hollow receiving sleeve 93 (as shown in FIG. 10). When the threaded orifice 61 of the anti-spray connector 5 is screwed with the air nozzle 9 of the tire 99, the valve bolt 8 is urged by the central needle 94 of the air nozzle 9 to press the first spring 51 so that the first seal ring 86 detaches from the tilted extension 522 of the lock element 52, and the hollow cavity 520 of the lock element 52 is communicated, in the meantime, the chemical sealant is pushed by the compressed airs to flow into the tire 99 via the conduit 73 of the cylindrical base 7, the cylindrical room 70 of the cylindrical base 7, the multiple recesses 83 of the connecting disc 82 of the valve bolt 8, the multiple spaced slots 85 of the valve bolt 8, the passing orifice 540 of the abutting loop 54, the threaded orifice 61, the aperture 922 of the mounting 92 of the air nozzle 9, the hollow receiving sleeve 93, and the holder 932 of the hollow receiving sleeve 93, thus feeding the chemical sealant and inflating the compressed airs to the tire 99.

Thereby, the anti-spray structure for the connection of the air nozzle of the tire of the vehicle and the connection hose of the air compressor is capable of avoiding the eruption of the chemical sealant in an incorrect operation.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:
1. An air compressor system comprising:
  a box including a body of an air compressor accommodated in the box and started by a power supply;
  a sealant supply can including an open segment extending downward and configured to accommodate chemical sealant for repairing a tire which is broken, and the sealant supply can including a supply tube;
  a connection hose including a first segment formed on a first end of the connection hose, and the connection hose including a second segment formed on a second end the connection hose, the first segment being con- nected with the supply tube of the sealant supply can, and the second segment being connected with an air nozzle of the tire;

wherein the second segment has an anti-spray connector connected thereon, and the anti-spray connector includes a fitting sleeve, wherein the fitting sleeve has a threaded orifice formed in a first end thereof and having female threads, a through orifice defined on a second end of the fitting sleeve, and a projected shoulder formed on an inner wall of the through orifice, wherein a diameter of the projected shoulder is more than a diameter of the through orifice, and the threaded orifice is communicated with the through orifice;

wherein a cylindrical base includes a cylindrical room, a stepped coupling segment extending on a second end of the cylindrical base, and a conduit defined in the coupling segment and communicating with the cylindrical room, wherein a diameter of the cylindrical room is more than a diameter of the conduit, and the cylindrical base further includes a first stepped portion formed between the cylindrical room and the conduit;

wherein a first spring is received into the cylindrical room of the cylindrical base so that a first end of the first spring abuts against first stepped portion;

wherein a valve bolt includes a post extending on a first end thereof, a connecting disc extending from a second end of the valve bolt, multiple spaced slots defined around the post, and a first seal ring fitted on the valve bolt, such that the second end of the valve bolt is put into the cylindrical room of the cylindrical base to contact with a second end of the first spring;

wherein a lock element includes a hollow cavity defined therein, a hexagonal tab extending around a first end of the lock element, and a tilted extension extending on a second end of the lock element, such that the first spring pushes the valve bolt to contact with the lock element, and the first seal ring of the valve bolt abuts against the tilted extension of the lock element; and wherein the multiple spaced slots of the valve bolt pass through the hollow cavity of the lock element to locate in the threaded orifice, hence the first spring forces the first seal ring of the valve bolt to contact with the tilted extension of the lock element matingly.

2. The air compressor system as claimed in claim 1, wherein the fitting sleeve has a chamber defined therein, and the threaded orifice, the chamber, and the through orifice are communicated with one another; the cylindrical base further includes female threads formed adjacent to a first end of the cylindrical base, a recessed section formed on an outer wall of the cylindrical base proximate to the coupling segment, wherein a diameter of the cylindrical base is more than a diameter of the recessed section, and a second stepped portion is defined between the cylindrical base and the recessed section; the coupling segment of the cylindrical base is put into the chamber from the threaded orifice of the fitting sleeve via the through orifice, such that the projected shoulder contacts with the second stepped portion of the cylindrical base.

3. The air compressor system as claimed in claim 2, wherein the valve bolt further includes multiple recesses formed around an outer wall of the connecting disc, a neck formed between the post and the connecting disc, and the first seal ring fitted on the neck of the valve bolt.

4. The air compressor system as claimed in claim 3, wherein the lock element has male threads formed around the tilted extension thereof; a second seal ring is fitted from the male threads of the tilted extension of the lock element to contact with the hexagonal tab, such that when the lock element is fixed with the valve bolt and the cylindrical base, the male threads of the lock element are screwed with the female threads of the cylindrical base.

5. The air compressor system as claimed in claim 4, wherein an abutting loop has a passing orifice and is put into the threaded orifice of the fitting sleeve to fit on the lock element and to abut against the hexagonal tab.

6. The air compressor system as claimed in claim 2, wherein the coupling segment of the cylindrical base extends out of the fitting sleeve to connect with the second segment of the connection hose, and a fixing bushing is configured to connect the connection hose and the anti-spray connector.

7. The air compressor system as claimed in claim 1, wherein a valve core assembly is accommodated in the air nozzle of the tire, and the valve core assembly includes a mounting, an arcuate stop shoulder surrounding around a mouth of the mounting and extending inward from an end of the mounting, and an aperture defined in the mounting; a hollow receiving sleeve having a retaining shoulder formed on a first end of the hollow receiving sleeve, and a holder formed on a second end of the hollow receiving sleeve; a central needle formed in a column shape and having multiple spaced ribs formed on the central needle; a second spring fitted with the central needle and a first end of the second spring abutting against the multiple spaced ribs of the central needle; the central needle being received in the hollow receiving sleeve from the first end of the hollow receiving sleeve so that a second end of the second spring contacts with the holder, and the second spring is surrounded by the receiving hollow sleeve; a contacting loop fitted on a first end of the central needle; such that after the hollow receiving sleeve is connected with the mounting, the arcuate stop shoulder of the mounting engages with the retaining shoulder of the hollow receiving sleeve, a second end of the central needle extends out of the aperture of the mounting, and the second spring pushes the contacting loop of the central needle to close the holder of the hollow receiving sleeve.

\* \* \* \* \*